US011955307B2

(12) United States Patent
Jud et al.

(10) Patent No.: US 11,955,307 B2
(45) Date of Patent: Apr. 9, 2024

(54) ELECTRON EMITTER APPARATUS

(71) Applicant: Siemens Healthcare GmbH, Erlangen (DE)

(72) Inventors: Christoph Jud, Nuremberg (DE); Peter Hackenschmied, Nuremberg (DE); Joerg Freudenberger, Kalchreuth (DE); Peter Geithner, Erlangen (DE); Anja Fritzler, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 17/734,335

(22) Filed: May 2, 2022

(65) Prior Publication Data

US 2022/0359148 A1 Nov. 10, 2022

(51) Int. Cl.
*H01J 35/06* (2006.01)
*H05G 1/54* (2006.01)
*H05G 1/70* (2006.01)

(52) U.S. Cl.
CPC ............. *H01J 35/065* (2013.01); *H05G 1/54* (2013.01); *H01J 2235/068* (2013.01); *H05G 1/70* (2013.01)

(58) Field of Classification Search
CPC .... H01J 35/065; H01J 2235/068; H05G 1/54; H05G 1/70
See application file for complete search history.

(56) References Cited

U.S. PATENT DOCUMENTS 4,012,656 A 3/1977 Norman et al.
7,062,017 B1 * 6/2006 Runnoe ................. H01J 35/153 378/136
2003/0142790 A1 * 7/2003 Zhou .................... A61B 6/4028 378/119
2007/0246789 A1 10/2007 Freudenberger et al.
2011/0087062 A1 4/2011 Hornig et al.
2017/0236677 A1 * 8/2017 Tirén ........................ B03C 3/47 96/74
2021/0176850 A1 * 6/2021 Ru ........................... H05G 1/70

FOREIGN PATENT DOCUMENTS

| | | | |
|---|---|---|---|
| DE | 231061 | C | 2/1911 |
| DE | 2821597 | A1 | 11/1979 |
| DE | 19700992 | A1 | 7/1998 |
| DE | 102009049182 | A1 | 4/2011 |
| DE | 102006018633 | B4 | 12/2011 |
| EP | 3836187 | A1 | 6/2021 |

* cited by examiner

*Primary Examiner* — Chih-Cheng Kao
(74) *Attorney, Agent, or Firm* — Harness, Dickey & Pierce, P.L.C.

(57) ABSTRACT

At least one example embodiment provides an electron emitter apparatus having a first ring of field-effect emitter needles, the field-effect emitter needles of the first ring forming a first emitter surface on an inner side of the first ring; and a second ring of field-effect emitter needles, the field-effect emitter needles of the second ring forming a second emitter surface on an inner side of the second ring, wherein the first ring and the second ring are arranged in such that the first emitter surface and the second emitter surface form a substantially contiguous three-dimensional overall emitter surface, the substantially contiguous three-dimensional overall emitter surface defining a hollow channel along a longitudinal axis of the electron emitter apparatus.

20 Claims, 4 Drawing Sheets

ELECTRON EMITTER APPARATUS

CROSS-REFERENCE TO RELATED APPLICATIONS

The present application hereby claims priority under 35 U.S.C. § 119 to German patent application number DE 102021204540.5 filed May 5, 2021, the entire contents of each of which are hereby incorporated herein by reference.

FIELD

At least some example embodiments relate to an electron emitter apparatus, a method for generating an electron current, an X-ray beam source and a computer program product.

BACKGROUND

A conventional electron emitter apparatus may contain various kinds of electron emitter, for example a thermionic emitter or a field-effect emitter with field-effect emitter needles. Some electron emitter apparatuses may be heated in a direct or indirect manner. Examples of a thermionic emitter include a filament emitter or a flat emitter. A flat emitter is disclosed in DE 10 2006 018 633 B4 which, during operation, has a lower electron density in the central region of the emitter sheet than in the region bordering the central region.

During operation of a conventional X-ray beam source with an electron emitter apparatus, it may happen that ions arriving from an anode of the conventional X-ray beam source are spun back in the direction of the electron emitter apparatus. The ions are generated on a regular basis during an interaction between the electrons generated by the electron emitter apparatus and the anode.

SUMMARY

In particular, as a result of their comparatively macroscopic structure, conventional thermionic emitters are more resistant than conventional field-effect emitters with field-effect emitter needles. The field-effect emitter needles, by contrast, can be damaged by the impacting ions, and ultimately destroyed.

Some example embodiments of the invention specify an electron emitter apparatus, a method for generating an electron current, an X-ray beam source and a computer program product with increased robustness and service life.

This may be achieved by the features of the independent claims. Advantageous embodiments are described in the subclaims.

At least one example embodiment provides an electron emitter apparatus having a first ring of field-effect emitter needles, the field-effect emitter needles of the first ring forming a first emitter surface on an inner side of the first ring; and a second ring of field-effect emitter needles, the field-effect emitter needles of the second ring forming a second emitter surface on an inner side of the second ring, wherein the first ring and the second ring are arranged in such that the first emitter surface and the second emitter surface form a substantially contiguous three-dimensional overall emitter surface, the substantially contiguous three-dimensional overall emitter surface defining a hollow channel along a longitudinal axis of the electron emitter apparatus.

In at least one example embodiment, the three-dimensional overall emitter surface is tube-shaped.

In at least one example embodiment, the three-dimensional overall emitter surface is tapered along the longitudinal axis.

In at least one example embodiment, a minimum internal radius of the first ring differs from a minimum internal radius of the second ring.

In at least one example embodiment, at least one of the first emitter surface forms a truncated cone-shaped peripheral surface, or the second emitter surface forms a truncated cone-shaped peripheral surface.

In at least one example embodiment, the first truncated cone-shaped emitter surface and the second truncated cone-shaped emitter surface are oriented in the same direction along the longitudinal axis.

In at least one example embodiment, a cone angle of the first truncated cone-shaped emitter surface differs from a cone angle of the second truncated cone-shaped emitter surface.

In at least one example embodiment, at least one of the first emitter surface forms a cylindrical peripheral surface, or the second emitter surface forms a cylindrical peripheral surface.

In at least one example embodiment, the first emitter surface is configured to generate a first electron current for a first focal spot, the second emitter surface is configured to generate a second electron current for a second focal spot and the first focal spot and the second focal spot differ.

In at least one example embodiment, the emitter apparatus further includes an emitter needle validation unit configured to ascertain a degree of functionality of at least one field-effect emitter needle on at least one of the first ring or the second ring, and a control unit, the control unit configured to switch the first emitter surface or the second emitter surface on or off as a function of the degree of functionality of the at least one field-effect emitter needle.

At least one example embodiment provides a method for generating an electron current including providing an electron emitter apparatus according to at least one example embodiment, ascertaining a degree of functionality of at least one field-effect emitter needle on at least one of the first ring or the second ring by an emitter needle validation unit; and switching on the first emitter surface or the second emitter surface as a function of the degree of functionality of the at least one field-effect emitter needle by a control unit, wherein the electron current is generated.

In at least one example embodiment, the first emitter surface or the second emitter surface is operated in an alternating manner.

At least one example embodiment provides an X-ray beam source, having an evacuated X-ray tube housing; an electron emitter apparatus according to at least one example embodiment arranged in the evacuated X-ray tube housing; and an anode arranged in the evacuated X-ray tube housing for generating X-ray beams as a function of electrons arriving from the electron emitter apparatus.

At least one example embodiment provides a computer program product having computer readable instructions, when executed by a computing unit, is configured to cause an electron emitter apparatus to ascertain a degree of functionality of at least one field-effect emitter needle on at least one of the first ring or the second ring by an emitter needle validation unit; and switch on the first emitter surface or the second emitter surface as a function of the degree of functionality of the at least one field-effect emitter needle by a control unit, wherein the electron current is generated.

BRIEF DESCRIPTION OF THE DRAWINGS

Example embodiments of the invention will now be described and explained in greater detail making reference to the exemplary embodiments illustrated in the figures. In principle, structures and units which remain substantially the same are identified in the following description of the figures with the same reference characters as on the first occurrence of the relevant structure or unit.

In the drawings.

DETAILED DESCRIPTION

Figure 1:
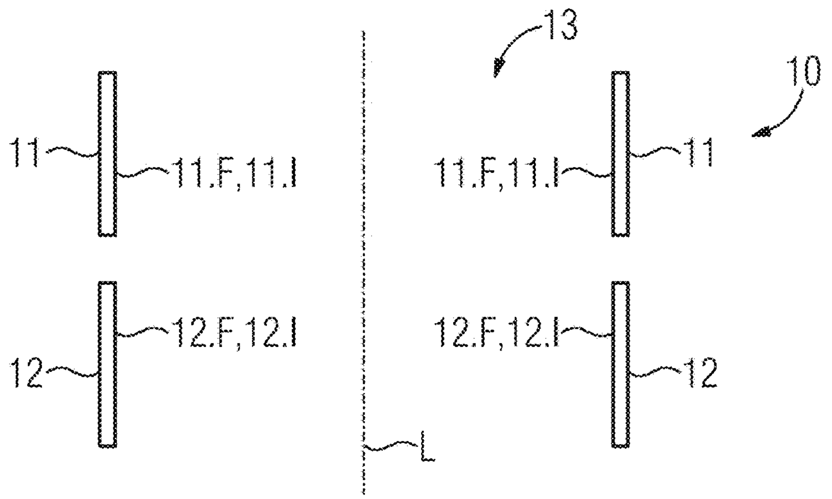
FIGS. 1 to 6 show various example embodiments of an electron emitter apparatus.

The electron emitter apparatus according to at least one example embodiment of the invention has

- a first ring of field-effect emitter needles, which form a first emitter surface on an inner side of the first ring, and
- a second ring of field-effect emitter needles, which form a second emitter surface on an inner side of the second ring, wherein the first ring and the second ring are arranged in such a manner that the first emitter surface and the second emitter surface form a substantially contiguous three-dimensional overall emitter surface, which is hollow along the longitudinal axis.

The fact that the three-dimensional overall emitter surface is ring-shaped and hollow along the longitudinal axis preferably means that the three-dimensional overall emitter surface has a central opening. Thus, a number of charged particles, in particular ions and/or charged clusters of a plurality of atoms, which arrive from the anode and impact on the three-dimensional overall emitter surface is reduced. This is because the charged particles at least partially pass through the middle of the hollow three-dimensional overall emitter surface. This means that the three-dimensional, in particular spatial embodiment of the overall emitter surface allows at least some of the charged particles to pass through the middle of the central opening.

The first ring and the second ring furthermore offer the advantage that it is possible to increase a number of the field-effect emitter needles, in particular the respective emitter surfaces, because advantageously better use is made of installation space along the longitudinal axis of the electron emitter apparatus. In particular, the electron emitter apparatus has a plurality of rows of emitter surfaces, which are arranged in an optimized manner with regard to installation space. An alternative conventional enlargement perpendicular to the longitudinal axis is disadvantageous, because a focal spot would also become wider due to a widening of the emission surface, which in turn would increase a lack of focus of the X-ray radiation. Compensation, by contrast, will therefore require an elaborate additional focusing, which example embodiments of this invention do not need. The three-dimensional overall emitter surface therefore enables an advantageous augmentation of the electron current.

A further advantage of the three-dimensional overall emitter surface is that the electron current can be increased, because due to the larger emitter surface an influence of an effect occurring during the emission, which may lead to a cracking and/or defocusing of the electron current as a result of the volume charge density and thus likewise to a widening of the focal spot, is reduced.

Advantageously, the arrangement of the field-effect emitter needles on the inner side of the first ring or the second ring in principle has a focusing effect on the electron current, while for example a conventional filament emitter has a defocusing effect as a result of its external shape per se.

The field-effect emitter needles may be constructed in various manners, for example as carbon field-effect emitter needles, metallic field-effect emitter needles or as silicon field-effect emitter needles. Typically, the electron emitter apparatus has only one kind of field-effect emitter needle. The metallic field-effect emitter needles are known inter alia as Spindt-type field-effect emitters. Field-effect emitter needles made of further materials, such as molybdenum for example, are likewise possible. The silicon field-effect emitter needles are arranged on a silicon substrate, for example, which advantageously may be produced in a planar manner, in relation to known production technologies in the field of semiconductors, see for example a silicon wafer for computer chip production, with diameters over many centimeters. In particular, the emitted electrons form the electron current. The electron current density of the field-effect emitter needles lies, for example, in a range greater than 0.1 A/cm^2 and/or less than 200 A/cm^2, preferably between 1 A/cm^2 and 50 A/cm^2, particularly advantageously between 5 A/cm^2 and 15 A/cm^2.

The distinction between a first ring of field-effect emitter needles and a second ring of field-effect emitter needles may be based on a row of field-effect emitter needles having a different spacing from a point on the anode than another row of field-effect emitter needles. The first ring particularly comprises a first group of field-effect emitter needles with a first spacing from the point on the anode and the second ring particularly comprises a second group of field-effect emitter needles with a second spacing from the point on the anode which is different from the first spacing. In principle, it is conceivable for the spacing of the field-effect emitter needles of the first ring or the second ring to vary, particularly if the first ring or the second ring is arranged with a tilt in relation to the anode. The first ring may particularly comprise field-effect emitter needles remote from the anode, and the second ring may particularly comprise field-effect emitter needles close to the anode.

When considering general practice, the first emitter surface and/or the second emitter surface is regularly three-dimensional. In particular, the first emitter surface and the second emitter surface may be pixelated. The first emitter surface and the second emitter surface may be part of the same substrate and/or the same circuit board.

The first emitter surface and/or the second emitter surface may be segmented and/or separated in a pixel-by-pixel manner. It is conceivable for the first ring or the second ring to be made from one piece and the first emitter surface and/or the second emitter surface to be segmented and/or separated in a pixel-by-pixel manner. Alternatively, the first ring and/or the second ring may consist of a plurality of sub-rings and/or sub-pieces. If the first emitter surface and/or the second emitter surface is segmented and/or separated in a pixel-by-pixel manner, then the three-dimensional overall emitter surface is typically segmented and/or separated in a pixel-by-pixel manner.

In principle, the three-dimensional overall emitter surface may be referred to as a ring-shaped emitter surface cascade. In addition to the first emitter surface and the second emitter surface, the three-dimensional overall emitter surface may comprise a further emitter surface, in particular on a third ring. In principle, more than three rings are also conceivable.

In particular, the first emitter surface and the second emitter surface are arranged one behind the other when viewed along the longitudinal axis. Substantially contiguous means in particular that the first emitter surface and the second emitter surface are preferably arranged in relation to one another in such a manner that a spacing between the two emitter surfaces is minimized. In principle, it is conceivable for the spacing between the two emitter surfaces to possibly be greater than zero, wherein the substantially contiguous three-dimensional overall emitter surface is nevertheless formed. Substantially contiguous therefore means that the first emitter surface and the second emitter surface are not distributed along a focal path of the anode or arranged adjacent to one another. In particular, substantially contiguous means that the electron current generated by the first emitter surface and the electron current generated by the second emitter surface regularly at least partially overlap and/or are oriented in parallel. Furthermore, substantially contiguous may mean that the electron current generated by the first emitter surface is able to pass through the second ring during operation of the electron emitter apparatus.

In particular, the electron emitter apparatus has the first ring, which comprises the field-effect emitter needles of the first emitter surface. In particular, the electron emitter apparatus has the second ring, which comprises the field-effect emitter needles of the second emitter surface.

In principle, it is conceivable for at least some of the field-effect emitter needles to be arranged on an outer side of the first ring and/or on an outer side of the second ring. Most of the field-effect emitter needles are typically arranged on the inner side. A significant proportion of the electron currents can preferably be generated from emitter surfaces which lie on the inner side of the first ring and/or the second ring. Depending on the cross-section of the first ring and/or the second ring, the inner side in particular also comprises the surface of the first ring and/or the second ring, for example the side thereof which faces toward the anode. In particular, the inner side is the side which faces toward the longitudinal axis of the three-dimensional overall emitter surface. The inner side lies at least partially within a volume, which comprises the three-dimensional overall emitter surface. The first emitter surface has at least one first emitter surface normal, which is perpendicular to the first emitter surface. The second emitter surface has at least one second emitter surface normal, which is perpendicular to the first emitter surface. As a result of the geometric embodiment of the first ring and/or the second ring, it is possible for the emitter surfaces to have a near-infinite number of emitter surface normals.

The at least one first emitter surface normal and/or the second emitter surface normal is not parallel with the longitudinal axis and/or may intersect the longitudinal axis at a finite point, from a mathematical perspective.

The term "ring" in this context in particular stands for geometric figures that are comparable to a conventional ring, such as polygons with N>2 corners, which have a central opening. In other words, the first ring and/or the second ring is not necessarily round or oval, but rather at least one of the two rings may be a triangle, for example, while the other ring is round or a quadrilateral. In principle, it is conceivable for the ring to be approximated by a polygon with many corners, by way of approximation. Furthermore, it is possible for the first ring and/or the second ring to be symmetrical or asymmetrical in relation to one another or in relation to themselves.

One embodiment provides that the three-dimensional overall emitter surface is tube-shaped. In particular, tube-shaped means that an internal diameter of the three-dimensional overall emitter surface is substantially constant. The embodiment is particularly advantageous, because a maximum number of charged particles arriving from the anode are able to pass.

An alternative embodiment to the previous embodiment provides that the three-dimensional overall emitter surface is tapered along the longitudinal axis. The fact that the three-dimensional overall emitter surface is tapered in particular means that the internal diameter of the three-dimensional overall emitter surfaces, at least in sections, is narrower than in another section. The variation of the internal diameter is typically smooth. Preferably, the internal diameter is narrower, the further away this section is from the anode. This embodiment is particularly advantageous, because the emitter surface facing toward the anode is enlarged.

One embodiment provides that a minimum internal radius of the first ring differs from a minimum internal radius of the second ring. This embodiment enables a flexible arrangement of the first ring and the second ring.

One embodiment provides that the first emitter surface forms a truncated cone-shaped peripheral surface and/or the second emitter surface forms a truncated cone-shaped peripheral surface. One advantage of this embodiment is that, as a result of the embodiment as a truncated cone-shaped peripheral surface, it is possible to increase a proportion of field-effect emitter needles facing directly toward the anode.

One embodiment provides that the first truncated cone-shaped emitter surface and the second truncated cone-shaped emitter surface are oriented in the same direction along the longitudinal axis. This embodiment is particularly advantageous if the emitter surfaces are embodied in the shape of a truncated cone, with the emitter surfaces and thus the electron current thereby being oriented in the same direction.

One embodiment provides that a cone angle of the first truncated cone-shaped emitter surface differs from a cone angle of the second truncated cone-shaped emitter surface. In particular, the cone angle comprises an angle between the longitudinal axis and a perpendicular to the emitter surface normal. Primarily, this embodiment may therefore be advantageous because the diameter of the central opening may be optimized depending on the internal radius of the first ring or the second ring, for example. Typically, the cone angles lie between 0° and 90°, regardless of a direction of the longitudinal axis. In principle, it is conceivable for both cone angles to be 0°. Furthermore, it is conceivable for one of the two cone angles to be up to and including 90°.

One embodiment provides that the first emitter surface forms a cylindrical peripheral surface and/or the second emitter surface forms a cylindrical peripheral surface. Preferably, this embodiment is optimized with regard to the proportion of field-effect emitter needles which face away from the anode and are thus protected from charged particles, while simultaneously ensuring a sufficient electron current.

One embodiment provides that it is possible to generate a first electron current for a first focal spot by the first emitter surface, wherein it is possible to generate a second electron current for a second focal spot by the second emitter surface and wherein the first focal spot and the second focal spot differ in position and/or size. In particular, this embodiment may be characterized by variation of the embodiment of the rings, for example as cylindrical or truncated cone-shaped peripheral surface and/or by setting the corresponding cone angle and/or by correspondingly adjusting the minimum internal radii. In principle, this embodiment makes it possible for the first ring and the second ring to be able to be operated in an alternating manner, but also simultaneously, for example by the electron currents of the two emitter surfaces supplementing one another or being superimposed over one another. As a result, for example, higher electron currents are possible, because an emitter surface is able to cool down in the switched-off state during pulsed operation, in order to reduce the thermal load. In particular, the first emitter surface and the second emitter surface may be actuated for such a generation of the electron currents, such that a springing focal spot, also known as a spring focus, is implemented on the anode.

One embodiment provides that the electron emitter apparatus furthermore has an emitter needle validation unit, which is embodied to ascertain a degree of functionality of at least one field-effect emitter needle on the first ring and/or the second ring, and a control unit, which is embodied to switch the first emitter surface or the second emitter surface on or off as a function of the degree of functionality of the at least one field-effect emitter needle. This embodiment is particularly advantageous, because the electron emitter apparatus is redundantly constructed in such a manner that a defect within the first ring or the second ring does not necessarily lead to the failure of the entire electron emitter apparatus. This is because, as a result of the three-dimensional internal overall emitter surface, the function of the first ring or the second ring can be substituted by the function of the other ring, without the electron emitter apparatus having to be replaced.

The X-ray beam source according to at least one example embodiment of the invention has

- an evacuated X-ray tube housing,
- an electron emitter apparatus arranged in the evacuated X-ray tube housing and
- an anode arranged in the evacuated X-ray tube housing for generating X-ray beams as a function of electrons arriving from the electron emitter apparatus. Typically, the electron emitter apparatus is arranged opposite a focal path of the anode. Depending on the embodiment of the X-ray beam source, a focus head may be provided, which deflects the electron current from the electron emitter apparatus in the direction of the anode. Alternatively or additionally, an electrostatic or electromagnetic deflection system between the electron emitter apparatus and the anode, as part of the X-ray beam source, may deflect the electron currents onto the anode. The deflection may in principle comprise a focusing and/or forming and/or positioning of the electron current.

The anode usually features an electrically conductive material such as molybdenum, graphite and/or tungsten, for example. The anode thus typically has a single electrical potential, which is evenly distributed over the anode. In principle, it is conceivable for the anode to consist of the electrically conductive material.

The method according to at least one example embodiment of the invention for generating an electron current has the following steps:

- providing an electron emitter apparatus,
- ascertaining a degree of functionality of at least one field-effect emitter needle on the first ring and/or the second ring by an emitter needle validation unit and
- switching on the first emitter surface or the second emitter surface as a function of the degree of functionality of the at least one field-effect emitter needle by a control unit, wherein the electron current is generated.

One embodiment provides that the first emitter surface or the second emitter surface is operated in an alternating manner.

The computer program product according to at least one example embodiment of the invention, which can be loaded directly into a memory of a computing unit, has program code in order to carry out the method according to at least one example embodiment of the invention for generating an electron current when the computer program product is executed in the computing unit. In particular, the computing unit may be embodied as part of the control unit.

The computer program product may be a computer program or comprise a computer program. In particular, the computer program product has the program code which map the method steps according to at least one example embodiment of the invention. As a result, the method according to at least one example embodiment of the invention can be carried out in a defined and repeatable manner, and control can be exerted over a dissemination of the method according to at least one example embodiment of the invention. The computer program product is preferably configured such that the computing unit can carry out the method steps according to at least one example embodiment of the invention by the computer program product. In particular, the program code can be loaded into a memory of the computing unit and typically can be carried out by a processor of the computing unit with access to the memory. If the computer program product, in particular the program code, is carried out in the computing unit, typically all the embodiments according to at least one example embodiment of the invention of the method described can be performed. The computer program product is, for example, saved on a physical, computer-readable medium and/or stored digitally as a data packet in a computer network. The computer program product may represent the physical, computer-readable medium and/or the data packet in the computer network. The at least one example embodiment of invention can thus also start from the physical, computer-readable medium and/or the data packet in the computer network. The physical, computer-readable medium can usually be connected directly to the computing unit, for example in that the physical, computer-readable medium is inserted into a DVD drive or into a USB port, whereby the computing unit can access the physical, computer-readable medium, in particular with read access. The data packet can preferably be retrieved from the computer network. The computer network may have the computing unit or be connected to the computing unit indirectly via a wide area network (WAN) connection and/or via a (wireless) local area network (WLAN or LAN) connection. For example, the computer program product may be stored digitally on a cloud server at a storage location of the computer network, and be transferred by the WAN via the Internet and/or by the WLAN or LAN to the computing unit, in particular by following a download link that points to the storage location of the computer program product.

Features, advantages or alternative embodiments mentioned in the description of the apparatus are also transferable similarly to the method and vice versa. In other words, claims for the method can be developed with features of the apparatus and vice versa. In particular, the apparatus according to at least one example embodiment of the invention can be used in the method.

FIGS. 1 to 6 show various cross-sections of an electron emitter apparatus 10. The electron emitter apparatus 10 has a first ring 11 of field-effect emitter needles, which form a first emitter surface 11.F on an inner side 11.I of the first ring 11. The electron emitter apparatus 10 has a second ring 12 of field-effect emitter needles, which form a second emitter surface 12.F on an inner side 12.I of the second ring 12. The first ring 11 and the second ring 12 are arranged in such a manner that the first emitter surface 11.F and the second emitter surface 12.F form a substantially contiguous three-dimensional overall emitter surface 13, which is hollow along the longitudinal axis L.

Charged particles arriving from the anode are preferably able to pass the electron emitter apparatus 10 along the longitudinal axis L without interacting with one of the emitter surfaces 11.F, 12.F.

By the first emitter surface 11.F it is possible to generate a first electron current, typically for a first focal spot. By the second emitter surface 12.F it is possible to generate a second electron current, for example for the first focal spot or for a second focal spot. The electron emitter apparatus 10 in FIGS. 1 to 6 may be developed in such a manner that the first focal spot and the second focal spot differ in position and/or size.

FIG. 1 shows a first embodiment of the electron emitter apparatus 10. The three-dimensional overall emitter surface 13 is tube-shaped. The first emitter surface 11.F forms a cylindrical peripheral surface. The second emitter surface 12.F forms a cylindrical peripheral surface.

Figure 2:
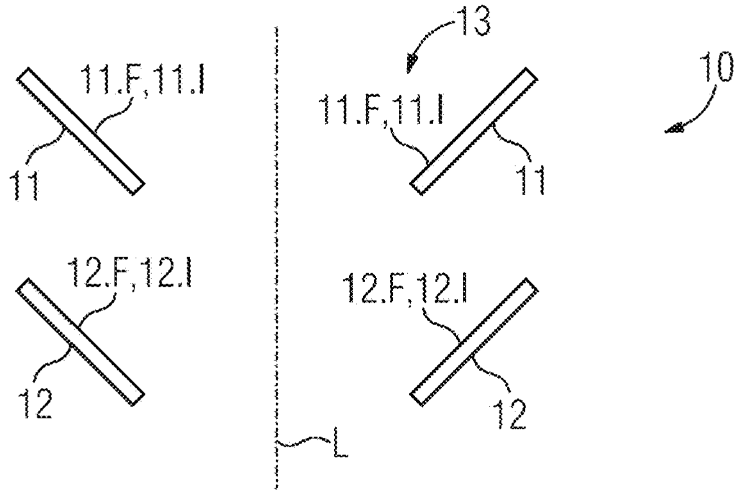

FIG. 2 shows a second embodiment of the electron emitter apparatus 10. The three-dimensional overall emitter surface 13 is tube-shaped. The first emitter surface 11.F forms a truncated cone-shaped peripheral surface and the second emitter surface 12.F forms a truncated cone-shaped peripheral surface. The first truncated cone-shaped emitter surface 11.F and the second truncated cone-shaped emitter surface 12.F are oriented in the same direction along the longitudinal axis L.

Unlike in FIGS. 1 and 2, the three-dimensional overall emitter surface 13 tapers in the exemplary embodiments in FIGS. 3 to 6. Additionally, a minimum internal radius of the first ring 11 differs from a minimum internal radius of the second ring 12. In these exemplary embodiments, an anode (not shown) is typically arranged closer to the first ring 11 than the second ring 12.

Figure 3:
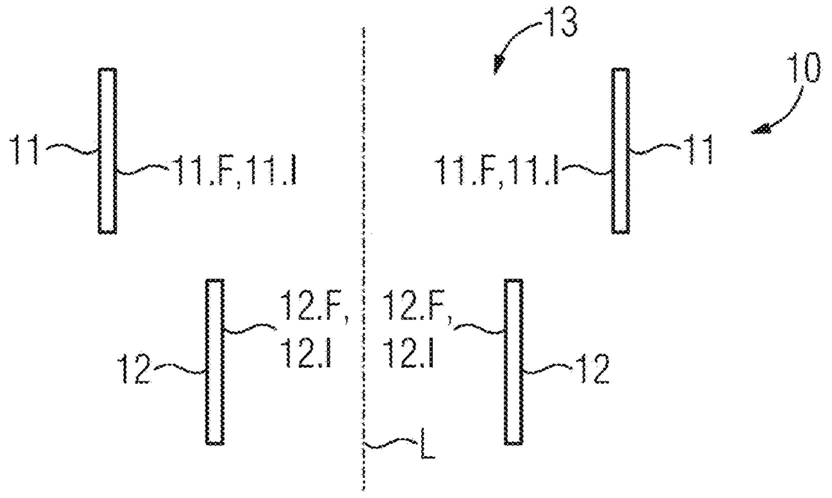

FIG. 3 shows a third embodiment of the electron emitter apparatus 10. The first emitter surface 11.F forms a cylindrical peripheral surface. The second emitter surface 12.F forms a cylindrical peripheral surface.

Figure 4:
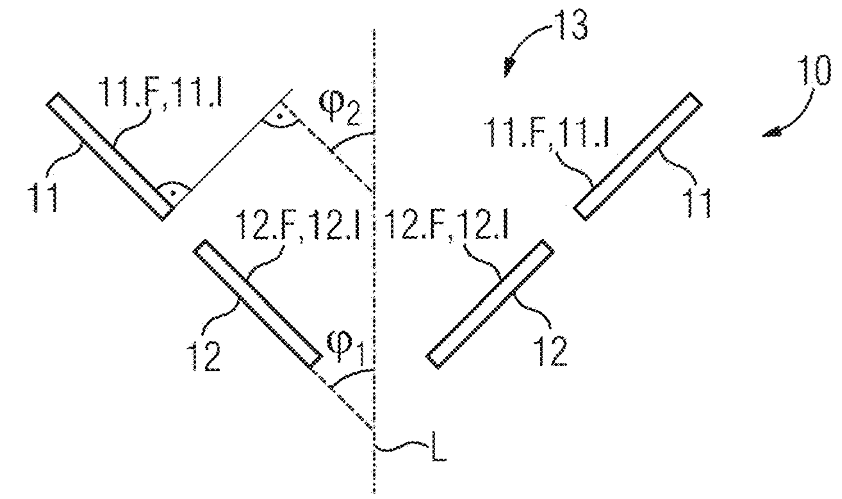

FIG. 4 shows a fourth embodiment of the electron emitter apparatus 10. The first emitter surface 11.F forms a truncated cone-shaped peripheral surface and the second emitter surface 12.F forms a truncated cone-shaped peripheral surface. The first truncated cone-shaped emitter surface 11.F and the second truncated cone-shaped emitter surface 12.F are oriented in the same direction along the longitudinal axis L.

In this exemplary embodiment, the cone angle φ1 of the first truncated cone-shaped emitter surface 11.F and the cone angle φ2 of the second truncated cone-shaped emitter surface 12.F are the same.

Figure 5:
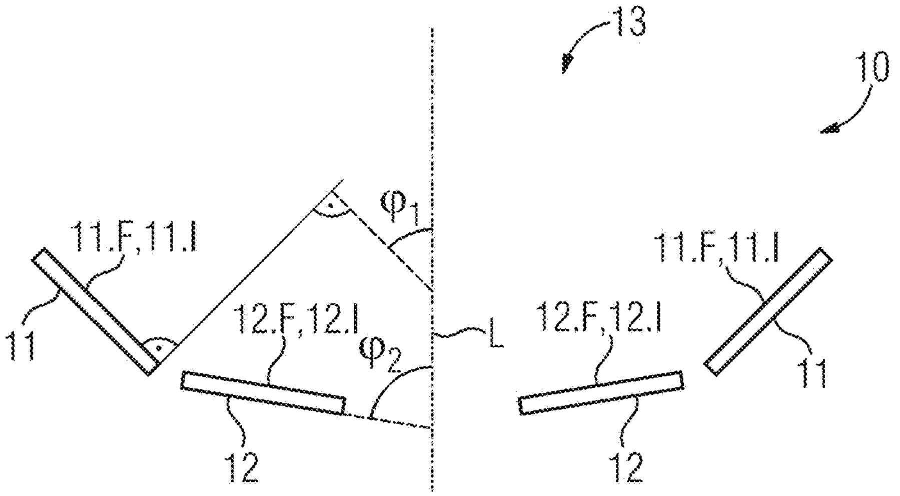

FIG. 5 shows a fifth embodiment of the electron emitter apparatus 10. The first emitter surface 11.F forms a truncated cone-shaped peripheral surface and the second emitter surface 12.F forms a truncated cone-shaped peripheral surface. The first truncated cone-shaped emitter surface 11.F and the second truncated cone-shaped emitter surface 12.F are oriented in the same direction along the longitudinal axis L.

A cone angle φ1 of the first truncated cone-shaped emitter surface 11.F differs from a cone angle φ2 of the second truncated cone-shaped emitter surface 12.F.

Figure 6:
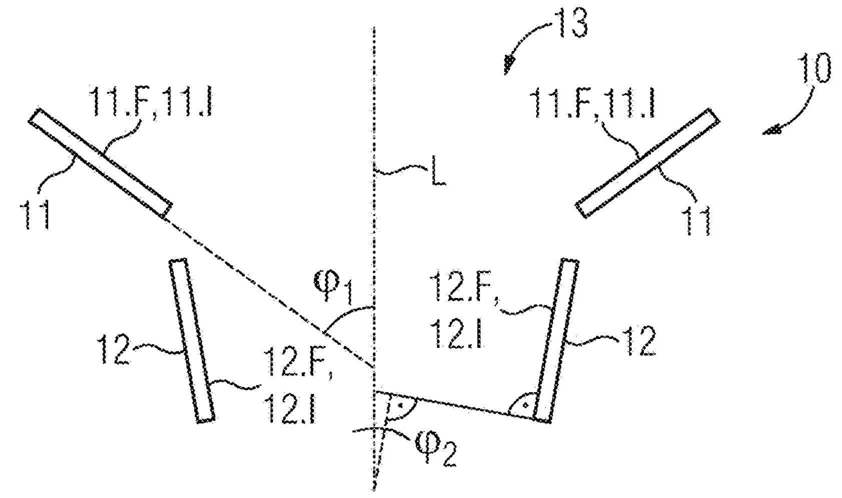

FIG. 6 shows a sixth embodiment of the electron emitter apparatus 10, as an alternative to the embodiment shown in FIG. 5, wherein the cone angle φ2 is substantially varied.

In principle, the sixth exemplary embodiment may be converted to an exemplary embodiment (not shown) with a right-angled overall emitter surface 13, wherein the cone angle φ1 is 90° and the cone angle φ2 is 0°.

Figure 7:
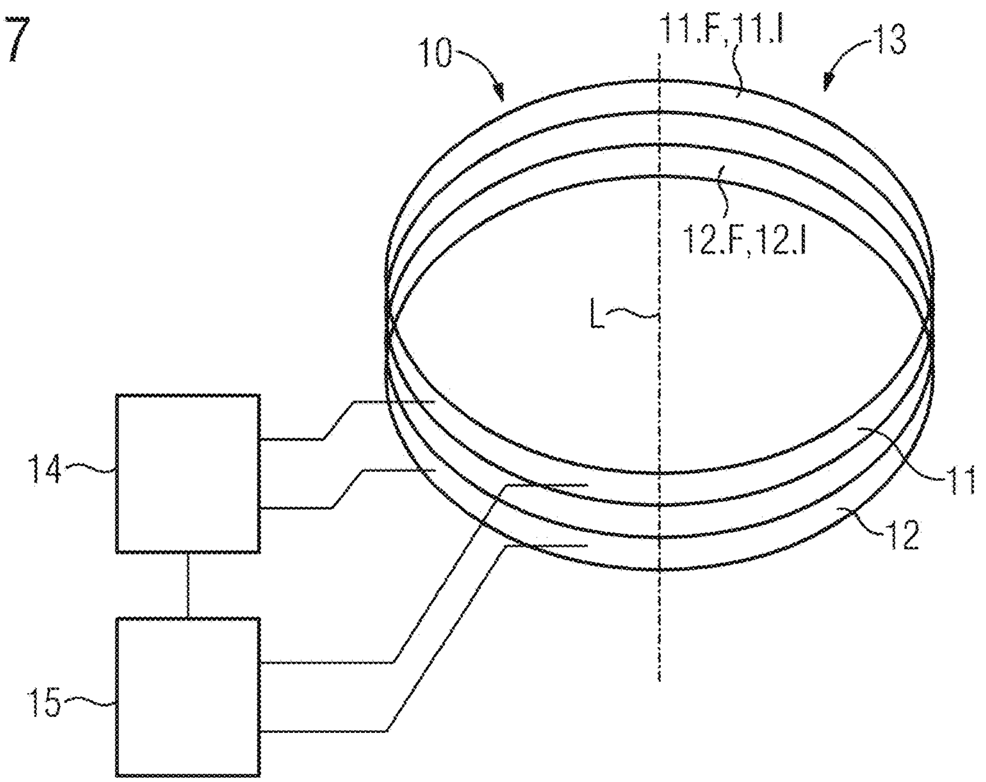
FIG. 7 shows a further electron emitter apparatus according to an example embodiment.

FIG. 7 shows a further embodiment of the electron emitter apparatus 10. For reasons of clarity, the two rings 11, 12 of the electron emitter apparatus 10 are substantially shown without the embodiment details shown previously.

The electron emitter apparatus 10 furthermore has an emitter needle validation unit 14, which is embodied to ascertain a degree of functionality of at least one field-effect emitter needle on the first ring 11 and/or the second ring 12. For example, the degree of functionality may be "fully operational" and "defective" in a binary manner. In addition, intermediate levels according to a remaining performance capability and/or remaining electron current capacity are also conceivable. The emitter needle validation unit 14 may have an optical sensor or an infrared sensor, in order to capture an image of the first emitter surface 11.F and/or the second emitter surface 12.F, for example. By image algorithm program code, it is preferably possible for a computing unit to ascertain the degree of functionality of the field-effect emitter needle in the captured image. Alternatively or additionally, the emitter needle validation unit 14 may have an ammeter and/or voltmeter, which provides the degree of functionality by the current supply to the field-effect emitter needles and/or via the voltage drop across the field-effect emitter needles. The emitter needle validation unit 14 may comprise an interface, which is able to output a signal corresponding to the degree of functionality. It is conceivable for the emitter needle validation unit 14 to monitor the field-effect emitter needles continuously during operation, and validate them accordingly.

The electron emitter apparatus 10 additionally has a control unit 15, which is embodied to switch the first emitter surface 11.F or the second emitter surface 12.F on or off as a function of the degree of functionality of the at least one field-effect emitter needle. The control unit 15 may have an interface for receiving the signal of the emitter needle validation unit 14, for example. For example, the control unit identifies when the degree of functionality of at least one field-effect emitter needle is already inadequate or will shortly become inadequate, in particular on the basis of a comparison with a threshold value. In this case, the control unit in particular switches off the emitter surface 11.F, 12.F with said field-effect emitter needle and switches on the other emitter surface 12.F, 11.F in each case. It is conceivable for the control unit 15 to additionally actuate a deflection system, in order to adapt a focal spot parameter as a function of the switched-on field-effect emitter needle 11.F, 12.F, for example.

Figure 8:
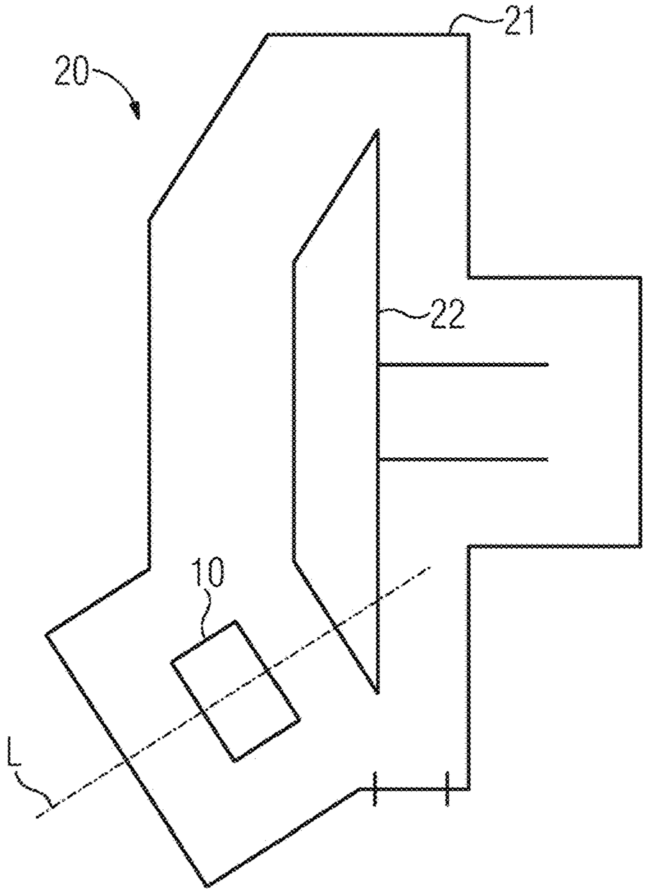
FIG. 8 shows an X-ray beam source according to an example embodiment.

FIG. 8 shows an X-ray beam source 20. The X-ray beam source 20 has an evacuated X-ray tube housing 21. The X-ray tube housing 21 typically comprises a metal or glass housing, which is closed off in a vacuum-tight manner. The electron emitter apparatus 10 and an anode 22 are arranged in the evacuated X-ray tube housing 21. The anode 22 is embodied for generating X-ray beams as a function of electrons arriving from the electron emitter apparatus 10. The electrons are typically accelerated from the electron emitter apparatus 10 toward the anode 22 by an acceleration voltage unit. In particular, the acceleration voltage lies between 10 and 150 kV. At the anode, which may be an anode mounted in a rotatable manner or a stationary anode, the arriving electrons interact, wherein for the most part heat and to a lesser extent X-ray radiation is generated. The X-ray beam source 20 may have a cooling unit for the dissipation of heat. The X-ray radiation is particularly suitable for computed tomography, angiography, radiography and/or mammography.

Figure 9:
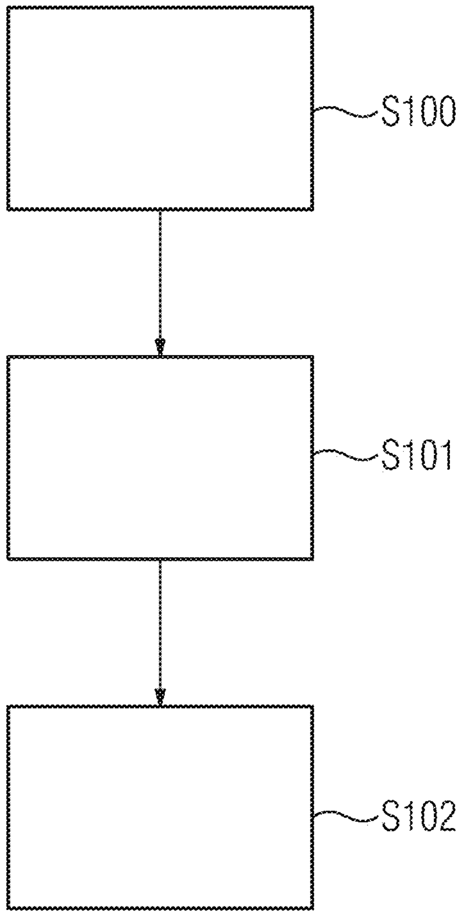
FIG. 9 shows a method for generating an electron beam according to an example embodiment.

FIG. 9 shows a method for generating an electron current in a flow diagram, with the following steps:

S100 characterizes providing an electron emitter apparatus 10.

S101 characterizes ascertaining a degree of functionality of at least one field-effect emitter needle on the first ring 11 and/or the second ring 12 by an emitter needle validation unit 14.

S102 characterizes switching on the first emitter surface 11.F or the second emitter surface 12.F as a function of the degree of functionality of the at least one field-effect emitter needle by a control unit 15, wherein the electron current is generated.

In principle, it is conceivable for the first emitter surface 11.F or the second emitter surface 12.F to be operated in an alternating manner.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as “processing” or “computing” or “calculating” or “determining” of “displaying” or the like, refer to the action and processes of a computer system, or similar electronic computing device/hardware, that manipulates and transforms data represented as physical, electronic quantities within the computer system’s registers and memories into other data similarly represented as physical quantities within the computer system memories or registers or other such information storage, transmission or display devices.

In this application, including the definitions below, the term ‘module’ or the term ‘controller’ may be replaced with the term ‘circuit.’ The term ‘module’ may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although some example embodiments of the invention have been illustrated and described in detail by the preferred exemplary embodiments, the invention is nevertheless not restricted by the examples given and other variations can be derived therefrom by the person skilled in the art without departing from the protective scope of the invention.

The invention claimed is:

1. An electron emitter apparatus comprising:

a first ring of field-effect emitter needles, the field-effect emitter needles of the first ring forming a first emitter surface on an inner side of the first ring; and a second ring of field-effect emitter needles, the field-effect emitter needles of the second ring forming a second emitter surface on an inner side of the second ring, the first ring and the second ring being arranged such that the first emitter surface and the second emitter surface form a substantially contiguous three-dimensional overall emitter surface, the substantially contiguous three-dimensional overall emitter surface defining a hollow channel along a longitudinal axis of the electron emitter apparatus.

2. The electron emitter apparatus as claimed in claim 1, wherein the substantially contiguous three-dimensional overall emitter surface is tube-shaped.

3. The electron emitter apparatus as claimed in claim 2, wherein a minimum internal radius of the first ring differs from a minimum internal radius of the second ring.

4. The electron emitter apparatus as claimed in claim 1, wherein the substantially contiguous three-dimensional overall emitter surface is tapered along the longitudinal axis.

5. The electron emitter apparatus as claimed in claim 4, wherein a minimum internal radius of the first ring differs from a minimum internal radius of the second ring.

6. The electron emitter apparatus as claimed in claim 1, wherein a minimum internal radius of the first ring differs from a minimum internal radius of the second ring.

7. The electron emitter apparatus as claimed in claim 1, wherein at least one of:

the first emitter surface forms a first truncated cone-shaped emitter surface; or the second emitter surface forms a second truncated cone-shaped emitter surface.

8. The electron emitter apparatus as claimed in claim 7, wherein the first truncated cone-shaped emitter surface and the second truncated cone-shaped emitter surface are oriented in the same direction along the longitudinal axis.

9. The electron emitter apparatus as claimed in claim 7, wherein a cone angle of the first truncated cone-shaped emitter surface differs from a cone angle of the second truncated cone-shaped emitter surface.

10. The electron emitter apparatus as claimed in claim 1, wherein at least one of:

the first emitter surface forms a cylindrical peripheral surface; or the second emitter surface forms a cylindrical peripheral surface.

11. The electron emitter apparatus as claimed in claim 1, wherein the first emitter surface is configured to generate a first electron current for a first focal spot; and the second emitter surface is configured to generate a second electron current for a second focal spot, the first focal spot differing from the second focal spot in position, size, or both position and size.

12. The electron emitter apparatus as claimed in claim 11, wherein the first ring and the second ring are configured to operate in an alternating manner.

13. The electron emitter apparatus as claimed in claim 1, further comprising:

processing circuitry configured to, ascertain a degree of functionality of at least one field-effect emitter needle among the first ring of field-effect emitter needles or the second ring of field-effect emitter needles, and switch the first emitter surface or the second emitter surface on or off as a function of the degree of functionality of the at least one field-effect emitter needle.

14. A method for generating an electron current, comprising:

providing an electron emitter apparatus as claimed in claim 13;

ascertaining a degree of functionality of at least one field-effect emitter needle on at least one among the first ring of field-effect emitter needles or the second ring of field-effect emitter needles; and switching on the first emitter surface or the second emitter surface as a function of the degree of functionality of the at least one field-effect emitter needle, the first emitter surface or the second emitter surface generating the electron current.

15. The method as claimed in claim 14, wherein the first emitter surface and the second emitter surface are operated in an alternating manner.

16. The electron emitter apparatus as claimed in claim 15, wherein the first emitter surface and the second emitter surface are operated in an alternating manner such that:

the first emitter surface is switched on and the second emitter surface is switched off; or the first emitter surface is switched off and the second emitter surface is switched on.

17. An X-ray beam source, comprising:

an evacuated X-ray tube housing;

an electron emitter apparatus as claimed in claim 1 arranged in the evacuated X-ray tube housing; and an anode arranged in the evacuated X-ray tube housing for generating X-ray beams as a function of electrons arriving from the electron emitter apparatus.

18. The electron emitter apparatus as claimed in claim 1, wherein the electron emitter apparatus is configured to emit electrons towards an anode external to the hollow channel.

19. A non-transitory computer-readable medium storing computer-readable instructions that, when executed by processing circuitry, cause an electron emitter apparatus to:

ascertain a degree of functionality of at least one field-effect emitter needle on a first ring of field-effect emitter needles, the field effect emitter needles of the first ring forming a first emitter surface on an inner side of the first ring;

compare the degree of functionality of the at least one field-effect emitter needle to a threshold value to obtain a comparison result; and switch on a second emitter surface in response to determining the degree of functionality of the at least one field-effect emitter needle is below the threshold value based on the comparison result, the second emitter surface being formed on an inner side of a second ring of field-effect emitter needles, and the second emitter surface generating an electron current based on being switched on.

20. The non-transitory computer-readable medium as claimed in claim 6, wherein the first ring and the second ring are arranged in such that the first emitter surface and the second emitter surface form a substantially contiguous three-dimensional overall emitter surface.

* * * * *